United States Patent
Li

(10) Patent No.: US 8,243,435 B2
(45) Date of Patent: *Aug. 14, 2012

(54) RETAINING APPARATUS FOR DATA STORAGE DEVICE

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 283 days.

This patent is subject to a terminal disclaimer.

(21) Appl. No.: 12/728,651

(22) Filed: Mar. 22, 2010

(65) Prior Publication Data

US 2011/0139735 A1   Jun. 16, 2011

(30) Foreign Application Priority Data

Dec. 14, 2009   (CN) .................... 2009 2 0317288 U

(51) Int. Cl.
*G06F 1/16* (2006.01)
(52) U.S. Cl. ................ 361/679.37; 312/223.2
(58) Field of Classification Search .............. 211/26; 312/223.1, 319.2, 223.2, 332.1; 361/679.31–679.39
See application file for complete search history.

(56) References Cited

U.S. PATENT DOCUMENTS

| | | | | |
|---|---|---|---|---|
| 5,721,669 A * | 2/1998 | Becker et al. | ............ | 361/679.31 |
| 6,067,225 A * | 5/2000 | Reznikov et al. | ........ | 361/679.31 |
| 6,378,965 B1 * | 4/2002 | Reznikov et al. | .......... | 312/332.1 |
| 6,606,256 B1 * | 8/2003 | Lee et al. | ...................... | 361/825 |
| 6,778,381 B1 * | 8/2004 | Bolognia et al. | ......... | 361/679.07 |
| 6,891,723 B1 * | 5/2005 | Lin et al. | ................. | 361/679.33 |
| 7,019,965 B2 * | 3/2006 | Bradley et al. | ........... | 361/679.38 |
| 7,254,017 B2 * | 8/2007 | Peng et al. | .............. | 361/679.33 |
| 7,303,170 B2 * | 12/2007 | Fan et al. | ..................... | 248/27.3 |
| 7,321,489 B2 * | 1/2008 | McAlister | ................ | 361/679.33 |
| 7,443,668 B2 * | 10/2008 | Hsu | ........................... | 361/679.33 |
| 7,477,511 B2 * | 1/2009 | Hsu et al. | ................. | 361/679.37 |
| 7,495,902 B2 * | 2/2009 | Connelly et al. | ......... | 361/679.35 |
| 7,511,953 B2 * | 3/2009 | Tao et al. | ................. | 361/679.39 |
| 7,551,427 B1 * | 6/2009 | Blaugrund et al. | ...... | 361/679.38 |
| 7,701,707 B2 * | 4/2010 | Peng et al. | .............. | 361/679.37 |
| 7,787,244 B1 * | 8/2010 | Liu | ........................... | 361/679.33 |
| 7,848,099 B1 * | 12/2010 | Zhang et al. | ............. | 361/679.38 |
| 7,864,520 B1 * | 1/2011 | Liu | ........................... | 361/679.33 |
| 7,864,522 B1 * | 1/2011 | Peng et al. | .............. | 361/679.33 |
| 7,924,557 B2 * | 4/2011 | Li | ............................. | 361/679.37 |
| 7,944,687 B2 * | 5/2011 | Walker et al. | ............ | 361/679.37 |
| 7,974,088 B2 * | 7/2011 | Li | ............................. | 361/679.37 |
| 8,009,416 B2 * | 8/2011 | Kang | ....................... | 361/679.38 |
| 8,023,263 B2 * | 9/2011 | Crippen et al. | .......... | 361/679.58 |
| 8,087,739 B2 * | 1/2012 | Chen | .......................... | 312/332.1 |

(Continued)

*Primary Examiner* — Darnell Jayne
*Assistant Examiner* — Devin Barnett
(74) *Attorney, Agent, or Firm* — Altis Law Group, Inc.

(57) ABSTRACT

A retaining apparatus includes a tray and a retaining member. The tray is used for receiving at least one data storage device. The retaining device includes a base member, a retaining member, an arm member and a locking member. The base member is attached to the tray. The retaining member is movably attached to the base member along a first direction. The retaining member includes an engaging portion, a retaining portion and a latch. The arm member is pivotably attached to the base member about a pivot axis, and the pivot axis is located at a first end of the arm member. The locking member is slidably attached to the arm member. The arm member includes a latching portion.

18 Claims, 10 Drawing Sheets

U.S. PATENT DOCUMENTS

| | | | |
|---|---|---|---|
| 2002/0101708 A1* | 8/2002 | Cheng | 361/685 |
| 2002/0109967 A1* | 8/2002 | Nabetani et al. | 361/684 |
| 2005/0024819 A1* | 2/2005 | Peng et al. | 361/685 |
| 2005/0135000 A1* | 6/2005 | Kao et al. | 360/97.01 |
| 2007/0211422 A1* | 9/2007 | Liu et al. | 361/685 |
| 2007/0230107 A1* | 10/2007 | Hsu et al. | 361/685 |
| 2008/0204994 A1* | 8/2008 | Wang | 361/685 |
| 2010/0284145 A1* | 11/2010 | Kang | 361/679.58 |
| 2010/0309621 A1* | 12/2010 | Chang et al. | 361/679.39 |
| 2011/0090639 A1* | 4/2011 | Li | 361/679.39 |

* cited by examiner

RETAINING APPARATUS FOR DATA STORAGE DEVICE

CROSS-REFERENCE TO RELATED APPLICATION

This application is related to co-pending U.S. patent application entitled "RETAINING APPARATUS FOR DATA STORAGE DEVICES", application Ser. No. 12/534,215, Application date Aug. 3, 2009.

BACKGROUND

1. Technical Field

The disclosure generally relates to a retaining apparatus for data storage devices, especially to a retaining apparatus with a tray for receiving and retaining at least one data storage device.

2. Description of Related Art

Typically, a data storage device, such as a hard disk drive is simply screwed to a computer enclosure. This conventional mounting means can be complex, difficult and substantially wastes time. In addition, in use, vibration of the data storage device may cause the screws to come loose and may result in damage to the data storage device. Understandably, some attempts have been taken to introduce a mounting apparatus for a data storage device without screws.

DETAILED DESCRIPTION

Figure 7:
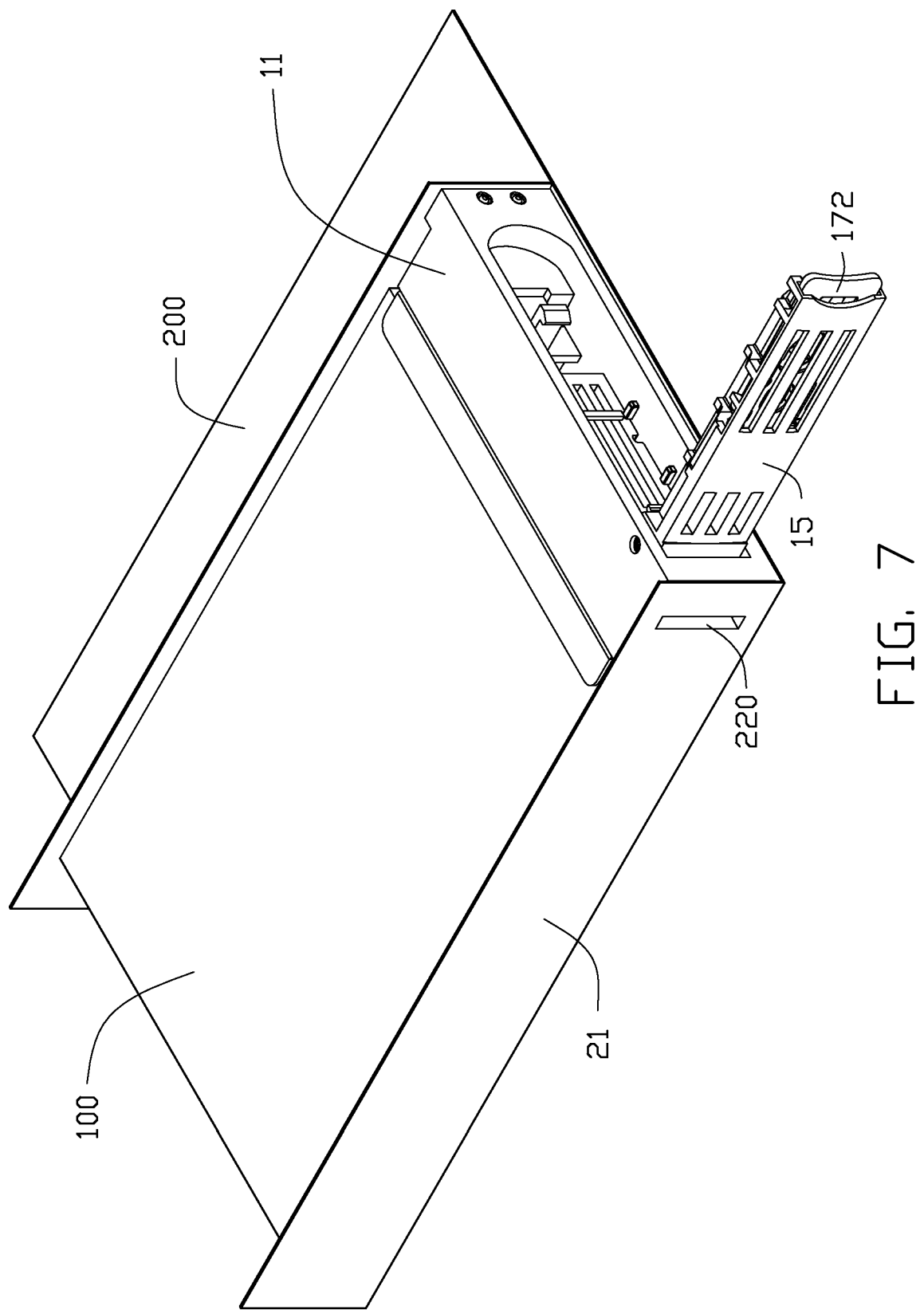
FIG. 7 is an assembled view of a data storage device, a retaining apparatus and a bracket.
Figure 8:
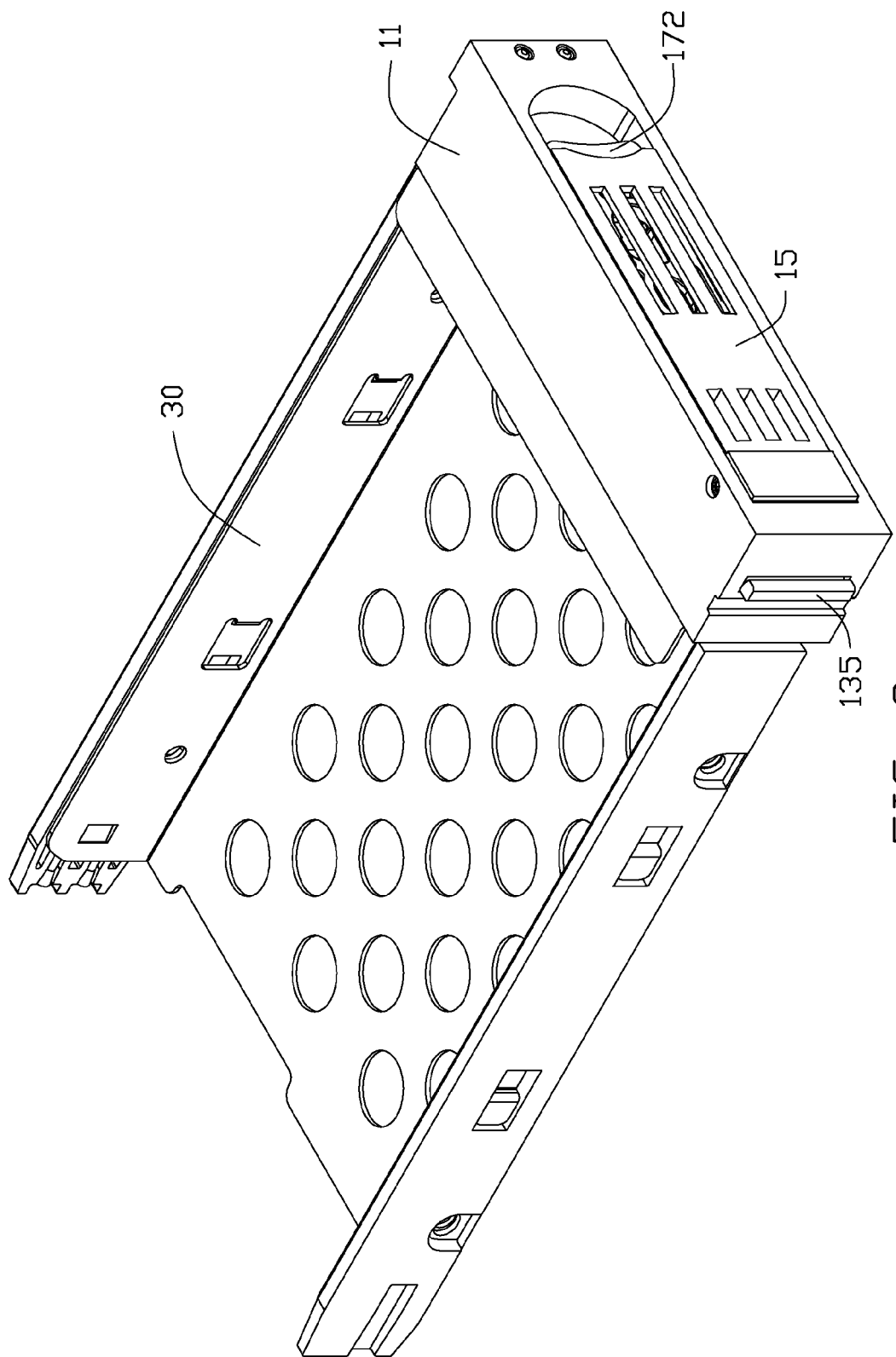
FIG. 8 is similar to FIG. 5, but showing the arm member positioned parallel to the base member.
Figure 9:
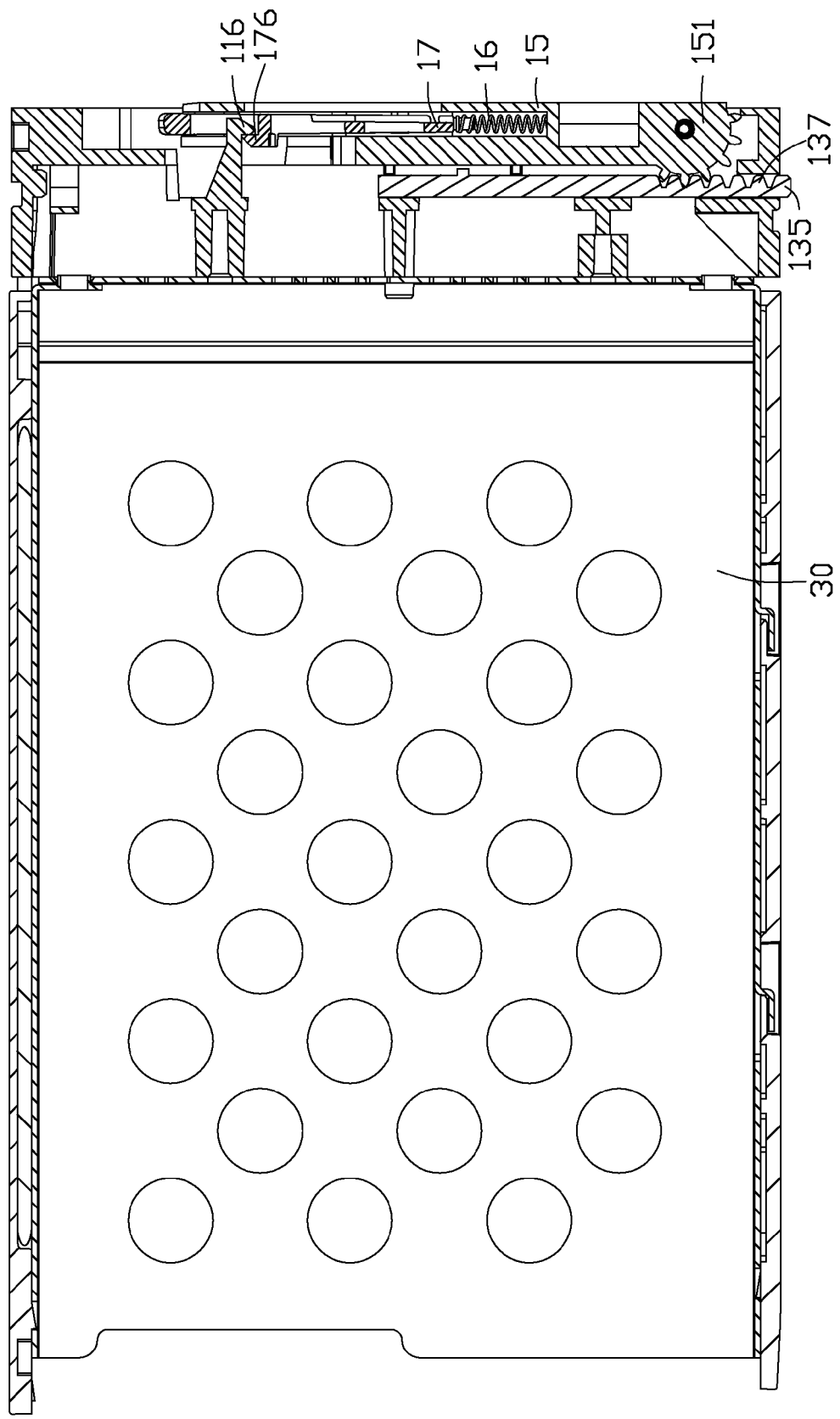
FIG. 9 is a sectional view of FIG. 8.

Referring to FIG. 7, a bracket 200 is used in a computer or an electronic device for mounting at least one retaining apparatus for data storage device 100. The bracket 200 includes two parallel side plates 21. A slideway is defined between the two side plates 21 for receiving the retaining apparatus. One of the side plates 21 defines a rectangular retaining opening 220.

Figure 1:
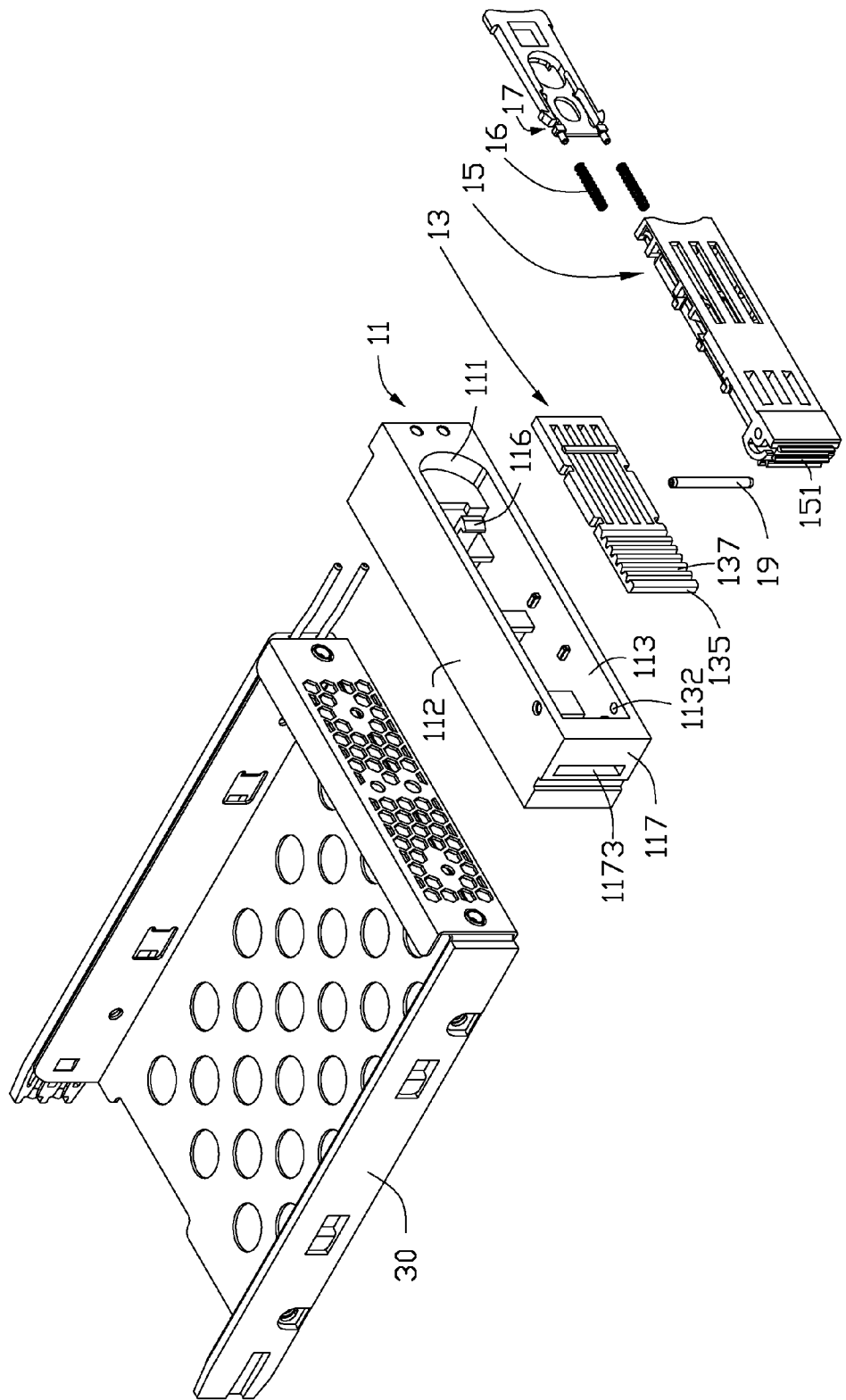
FIG. 1 is an exploded, isometric view of a retaining apparatus according to an embodiment.
Figure 2:
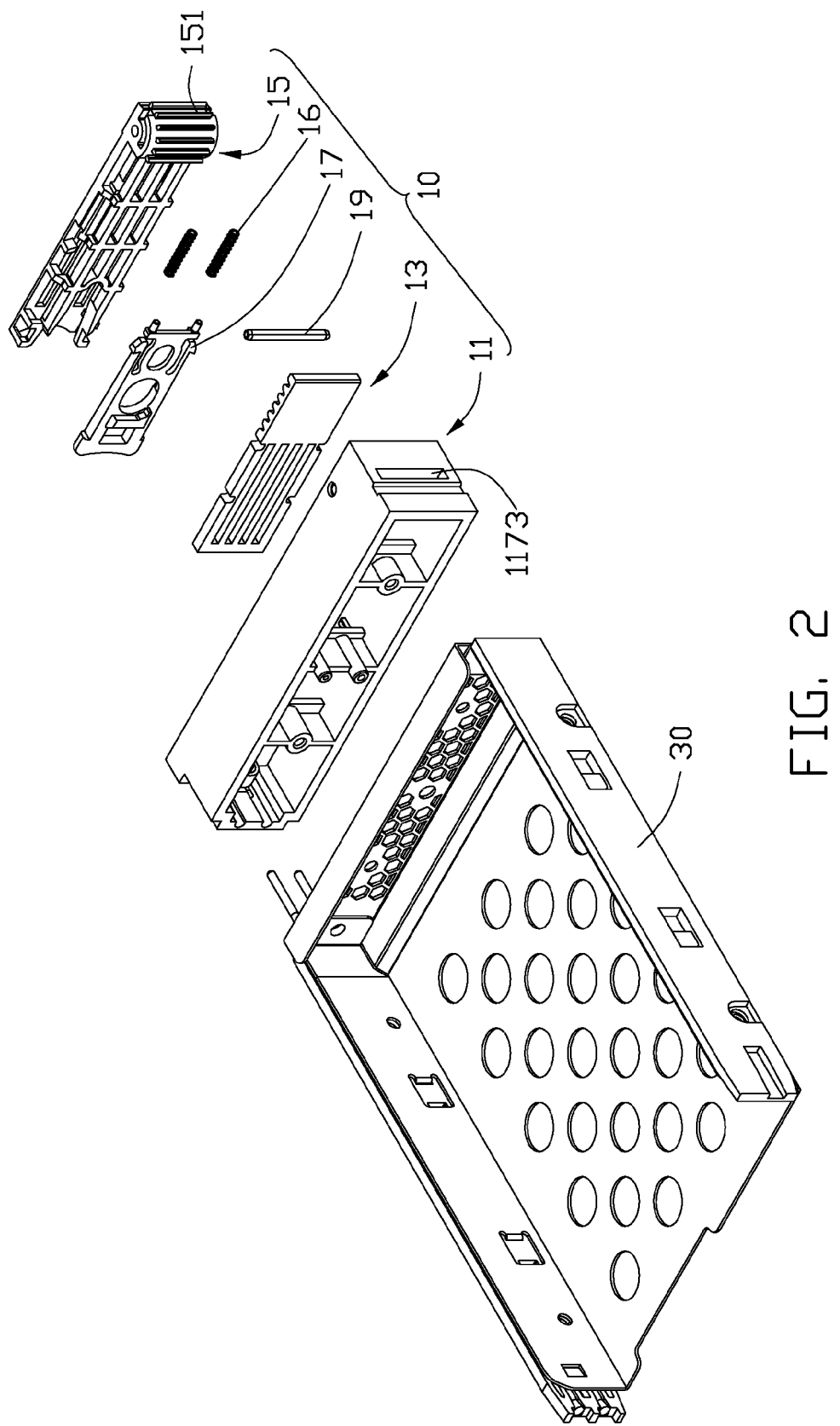
FIG. 2 is similar to FIG. 1, but shown in another aspect.

Referring to FIG. 1 and FIG. 2, each retaining apparatus includes a tray 30 and a retaining device 10.

The retaining device 10 includes a base member 11, a retaining member 13, an arm member 15, and a locking member 17.

The base member 11 defines a pair of pivot holes 1132 at one end thereof. A pivot shaft 19 extends through the two pivot holes 1132 to define a pivot axis. The base member 11 includes a top wall 112, a bottom wall 113, and two opposite sidewalls 117. The top wall 112, the bottom wall 113 and the sidewalls 117 are enclosed to from a cavity 111 to receive the retaining member 13, the arm member 15, and the locking member 17. A channel 1173 is defined at one of the sidewall 117 of the base member 11. A latch 116 protrudes from the base member 11 in the cavity 115.

The retaining member 13 is movably attached to the base member 11 along a first direction. The retaining member 13 includes an engaging portion 137 and a retaining portion 135. The engaging portion 137 includes a plurality of engaging teeth.

Figure 3:
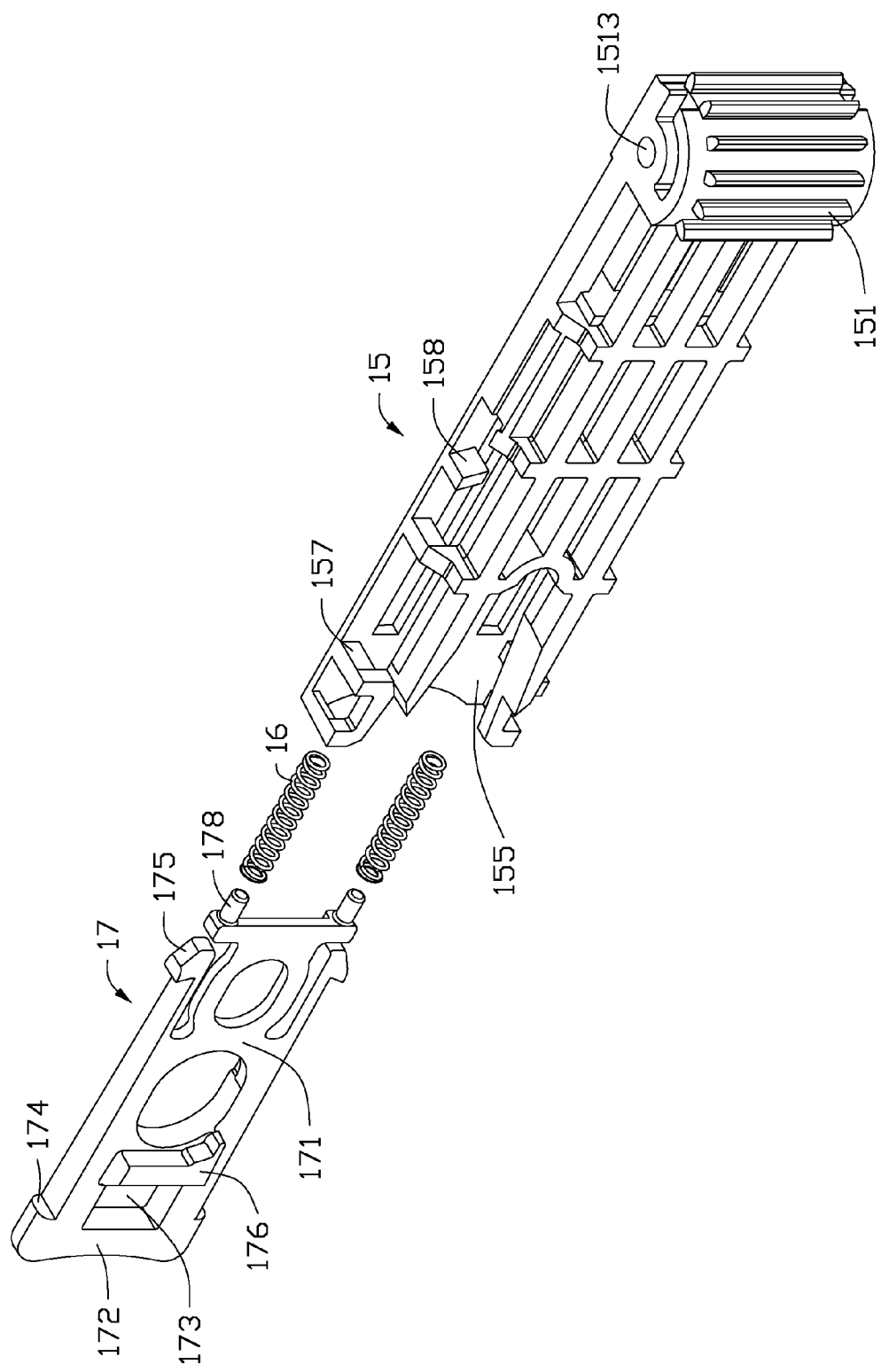
FIG. 3 is enlarged view of an arm member, a locking member and coin springs of FIG. 1.

Referring to FIG. 3, the locking member 17 includes a main body 171, an end portion 172, a latching portion 176 protruding from the main body 171, two restricting tabs 174, two resilient catches 175 and two posts 178. The main body 171 has a plate like configuration. The catches 175 are placed at two opposite side of the main body 171. The catches 175 and the main body 171 are positioned on a same plane. An opening 173 is defined in the main body 171 adjacent to the latching portion 176. The latching portion 176 partly covers the opening 173 so that the latch 116 can move into the portion of the opening 173 and engage with the latching portion 176.

The arm member 15 defines a pivot hole 1513 corresponding to the pivot shaft 12 and has a driving portion 151 corresponding to the engaging portion 137. The driving portion 151 has a plurality of driving teeth to mesh with the engaging teeth of the engaging portion 137. The arm member 15 defines a receiving space 155 for receiving the locking member 17. Two first blocks 157 and two second blocks 158 are formed on the arm member 15 and correspond to the restricting tabs 174 and the catches 175. The first blocks 157 can restrict movement of the locking member 17 to prevent movement into the arm member 15.

Figure 4:
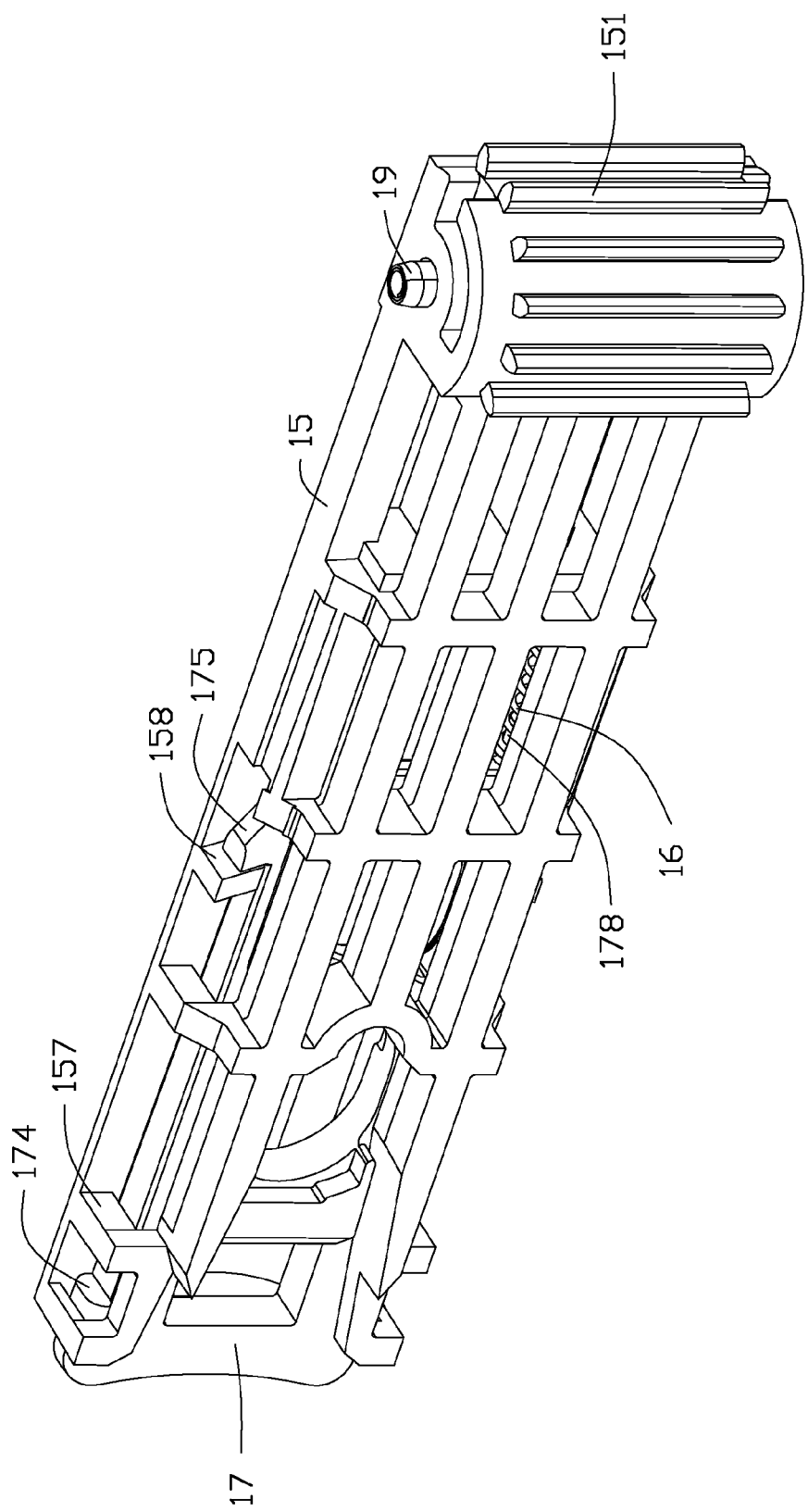
FIG. 4 is an assembled view of FIG. 3.

Referring to FIG. 4, when assembling the locking member 17 to the arm member 15, the locking member 17 is moved into the receiving space 155 of the arm member 15. Two coil springs 16 are located between the locking member 17 and the arm member 15. The coil springs 16 are compressed and provide ejection force to move the locking member 17 away from the arm member 15. The catches 175 are hooked on the second blocks 158 for holding the locking member 17 in the arm member 15. The end portion 172 extends from a free end of the arm member 15.

Figure 5:
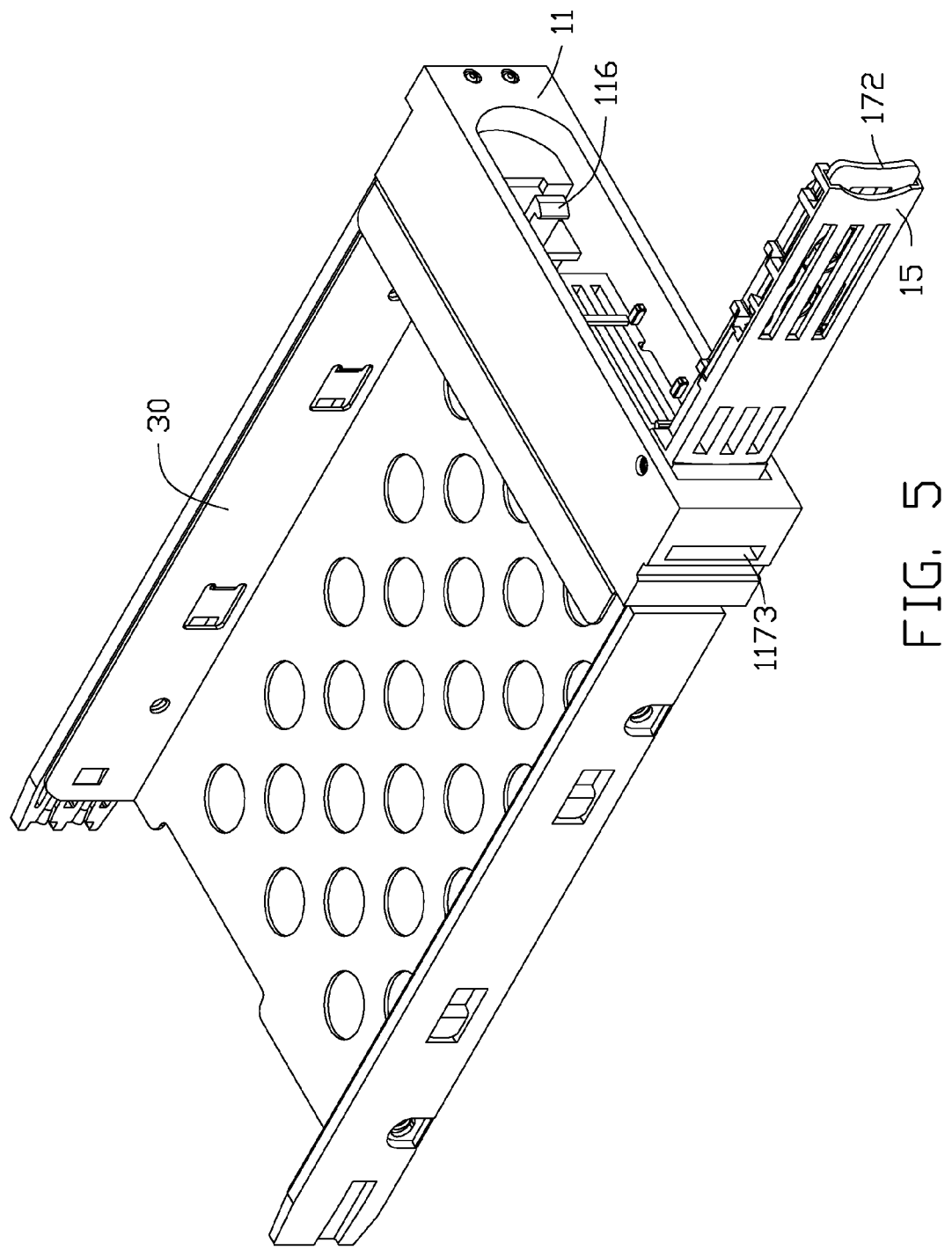
FIG. 5 is an assembled view of FIG. 1 with an arm member positioned oblique to a base member.
Figure 6:
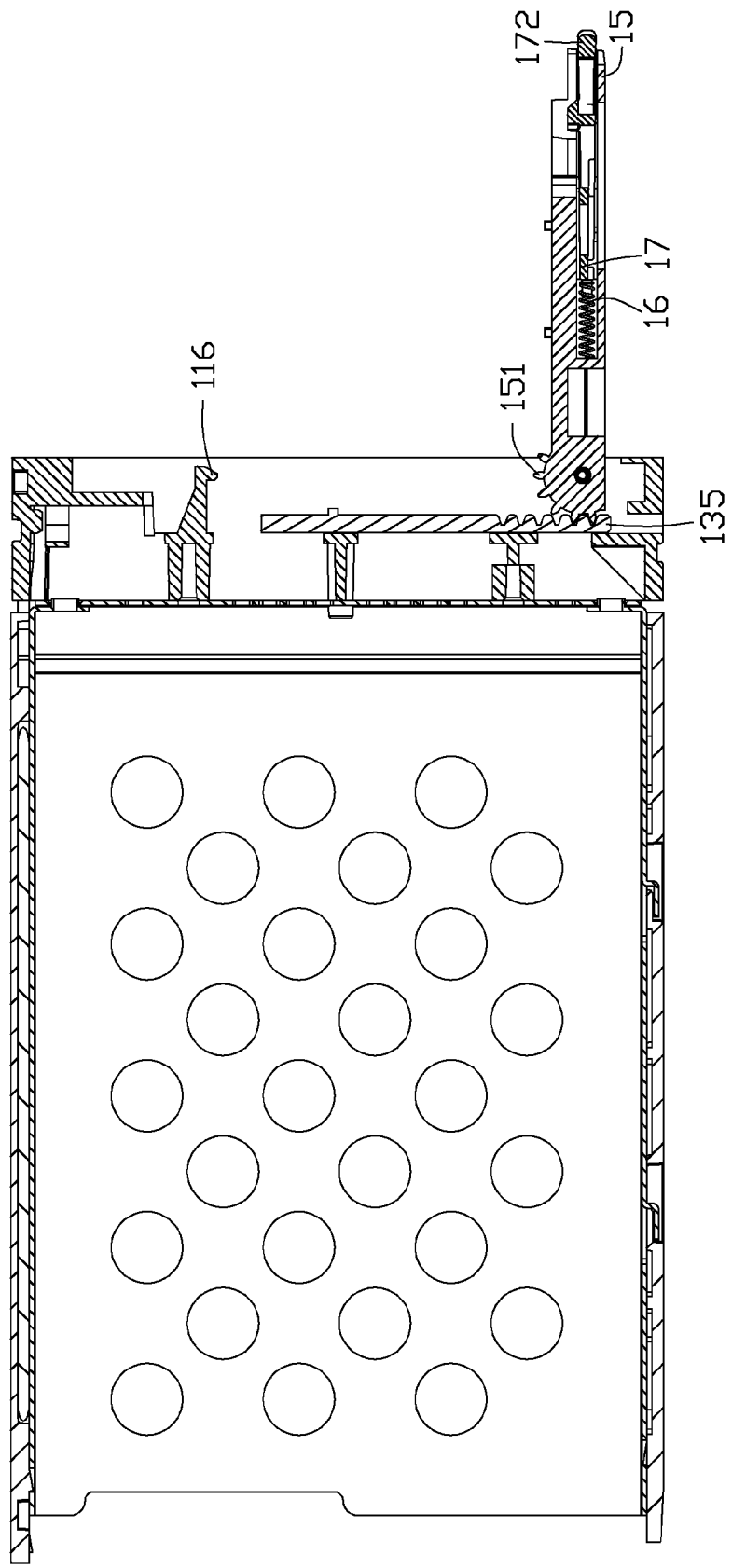
FIG. 6 is a sectional view of FIG. 5.

Referring through FIG. 5 to FIG. 6, when assembling the retaining apparatus, the base member 11 is mounted to the tray 30. The retaining member 13 is moved into the cavity 111 of the base member 11. The arm member 15 is pivotably fixed to the base member 11 about the pivot axis, and the driving portion 151 meshes with the engaging portion 137. The arm member 15 then is rotated relative to the retaining member 13 so that the retaining portion 135 resides in the cavity 111 of the base member 11.

Figure 10:
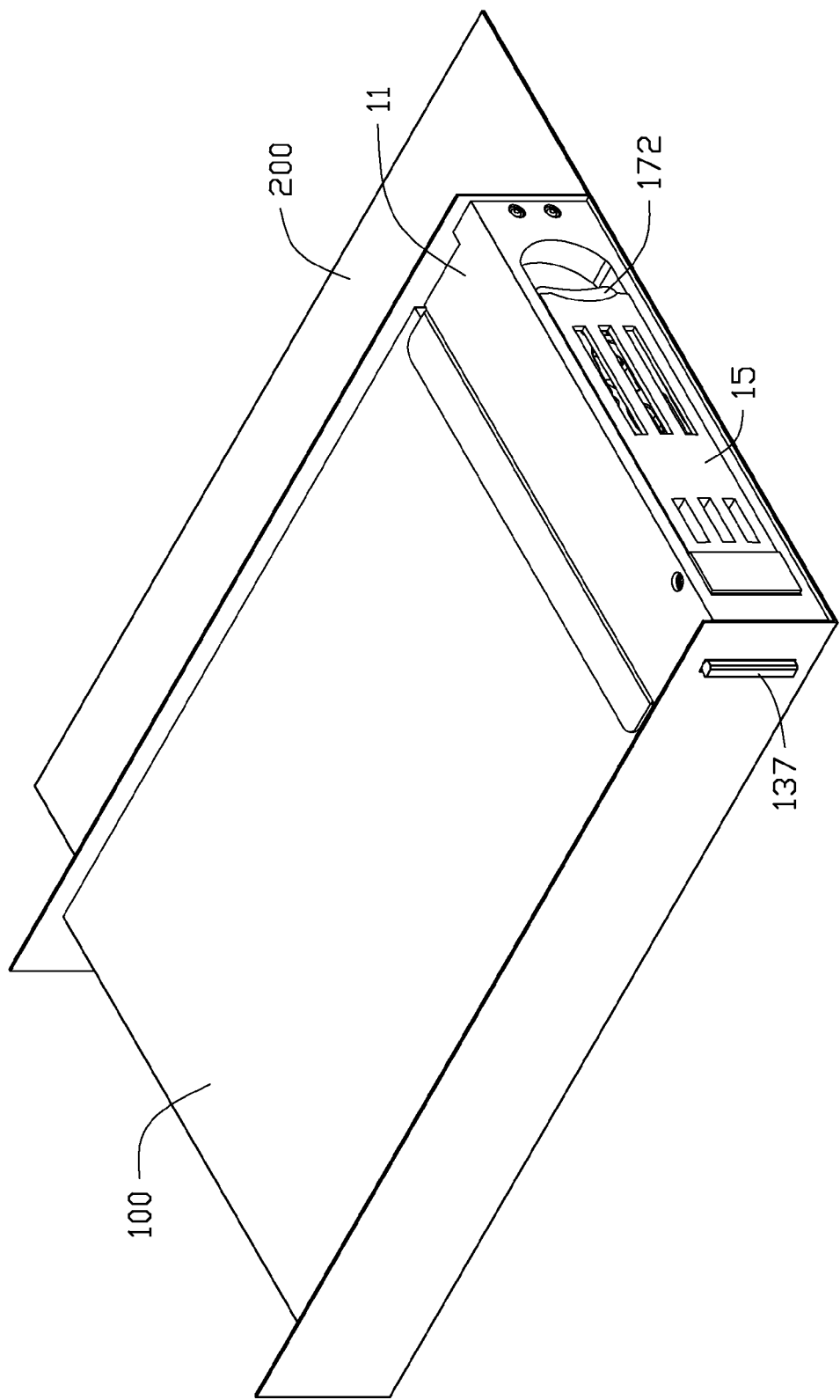
FIG. 10 is similar to FIG. 7, but showing the retaining apparatus mounted to the bracket.

Referring to FIG. 7 and FIG. 10, when mounting the retaining apparatus into the bracket 200, the tray 30 and the retaining device 10 are completely slid into the slideway of the bracket 200 with the channel 1173 aligned with the retaining opening 220. Then the arm member 15 is urged to rotate toward the base member 11, and drives the retaining portion 135 to move out of the channel 1173 to engage with the side plate 21 at the retaining opening 220. When the free end of the arm member 15 reaches the base member 11, the latch 116 moves into the opening 173 and engages with the latching portion 176 of the locking member 17. The retaining apparatus is thus mounted to the bracket 100.

When removing the retaining apparatus from the bracket 100, the locking member 17 is pressed on the end portion 172. The latch 116 is disengaged from the latching portion 176. Then, the arm member 15 is rotated outwardly from the base member 11. The retaining portion 135 moves into the cavity 111 of the base member 11 and disengages from the side plate 21 of the bracket 200. The retaining apparatus then is capable of being moved out of the bracket 200.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining apparatus comprising:
 a tray for receiving at least one data storage device; and
 a retaining device comprising:
  a base member attached to the tray, the base member comprising a latch;
  a retaining member movably attached to the base member along a first direction, the retaining member comprising an engaging portion, a retaining portion;
  an arm member pivotably attached to the base member about a pivot axis, the pivot axis being located at a first end of the arm member; the arm member comprising a driving portion at the first end engaged with the engaging portion; wherein the first direction is substantially perpendicular to the pivot axis; the retaining member is capable of being driven to move along the first direction by rotating the arm member; and
  a locking member slidably attached to the arm member, the locking member comprising a latching portion;
 wherein the arm member is capable of being moved relative to the base member from a latched state, where the latch is engaged with the latching portion, to a unlatched state, where that the locking member is disengaged from the latch;
 the arm member is rotatable between a retaining position where the arm member is positioned parallel to the base member, and the retaining portion is driven to protrude out of the base member, and a releasing position where the arm member is angled from the base member, and the retaining portion resides in the base member.

2. The retaining apparatus of the claim 1, wherein the engaging portion comprises a plurality of engaging teeth; and the driving portion has a plurality of driving teeth that mesh with the plurality of engaging teeth.

3. The retaining apparatus of the claim 1, wherein the arm member defines a receiving space for receiving the locking member.

4. The retaining apparatus of the claim 1, wherein the locking member comprises a main body and defines an opening for receiving the latch, the latching portion protrudes from the main body, and the opening is defined adjacent to the latching portion.

5. The retaining apparatus of the claim 4, wherein the latching portion partly covers the opening.

6. The retaining apparatus of the claim 4, wherein at least one resilient catch is formed on the main body, and at least one block is formed on the arm member corresponding to the at least one resilient catch.

7. The retaining apparatus of the claim 6, wherein the main body has a plate like configuration, and the at least one resilient catch and the main body are located on a same plane.

8. The retaining apparatus of the claim 1, wherein at least one elastic element is located between the locking member and the arm member.

9. The retaining apparatus of the claim 1, wherein the locking member has an end portion, and the end portion extends from a free end of the arm member.

10. An electronic device comprising:
 a bracket comprising a side plate, the side plate comprising a retaining opening at a front end thereof; and
 a retaining apparatus comprising:
  a tray for receiving a data storage device; and
  a retaining device comprising:
   a base member attached to the tray, the base member comprising a latch;
   a retaining member movably attached to the base member along a first direction, the retaining member comprising an engaging portion, a retaining portion;
   an arm member pivotably attached to the base member about a pivot axis, the pivot axis being located at a first end of the arm member; the arm member comprising a driving portion at the first end engaged with the engaging portion; wherein the first direction is substantially perpendicular to the pivot axis; the retaining member is capable of being driven to move along the first direction by rotating the arm member; and
   a locking member slidably attached to the arm member, the member comprising a latching portion;
  wherein the arm member is capable of being moved relative to the base member from a latched state, where the latch is engaged with the latching portion, to a unlatched state, where the locking member is disengaged from the latch;
  the arm member is rotatable between a retaining position where the arm member is positioned parallel to the base member, and the retaining portion is driven to protrude out of the base member to engage with the side plate at the retaining opening, and a releasing position where the arm member is angled from the base member, and the retaining portion resides in the base member and is disengaged from the side plate.

11. The electronic device of the claim 10, wherein the engaging portion comprises a plurality of engaging teeth; and the driving portion has a plurality of driving teeth that mesh with the plurality of engaging teeth.

12. The electronic device of the claim 10, wherein the arm member defines a receiving space for receiving the locking member.

13. The electronic device of the claim 10, wherein the locking member comprises a main body and defines an opening for receiving the latch, the latching portion protrudes from the main body, and the opening is defined adjacent to the latching portion.

14. The electronic device of the claim 13, wherein the latching portion partly covers the opening.

15. The electronic device of the claim 13, wherein at least one resilient catch is formed on the main body, and at least one block is formed on the arm member corresponding the at least one resilient catch.

16. The electronic device of the claim 15, wherein the main body has a plate like configuration, and the at least one resilient catch and the main body are located on a same plane.

17. The electronic device of the claim 15, wherein at least one elastic element is located between the locking member and the arm member.

18. The electronic device of the claim 10, wherein the locking member has an end portion, and the end portion extends from a free end of the arm member.

* * * * *